(12) United States Patent
Wang et al.

(10) Patent No.: US 8,909,049 B2
(45) Date of Patent: Dec. 9, 2014

(54) METHOD AND SYSTEM FOR CALCULATING SPECTRUM GRANULARITY IN FLEXIBLE GRID OPTICAL NETWORKS

(75) Inventors: Xi Wang, Murphy, TX (US); Qiong Zhang, Plano, TX (US); Inwoong Kim, Allen, TX (US); Paparao Palacharla, Richardson, TX (US); Motoyoshi Sekiya, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 697 days.

(21) Appl. No.: 13/175,154

(22) Filed: Jul. 1, 2011

(65) Prior Publication Data
US 2012/0263455 A1 Oct. 18, 2012

Related U.S. Application Data

(60) Provisional application No. 61/474,560, filed on Apr. 12, 2011.

(51) Int. Cl.
*H04B 10/00* (2013.01)
*H04J 14/02* (2006.01)

(52) U.S. Cl.
CPC .......... *H04J 14/026* (2013.01); *H04J 14/0257* (2013.01); *H04J 14/0224* (2013.01)
USPC .......................................................... 398/69

(58) Field of Classification Search
CPC ..................................................... H04B 10/272
USPC .......................................................... 398/69
See application file for complete search history.

(56) References Cited

U.S. PATENT DOCUMENTS

2004/0247317 A1* 12/2004 Sadananda .................. 398/57

* cited by examiner

*Primary Examiner* — Danny Leung
(74) *Attorney, Agent, or Firm* — Baker Botts L.L.P.

(57) ABSTRACT

In accordance with embodiments of the present disclosure, a method may include determining individual spectrum requirements for each of a plurality of signals to be communicated in an optical network, wherein a first signal of the plurality of signals has a first spectrum requirement and a second signal of the plurality of signals has a second spectrum requirement. The method may also include calculating a minimum spectrum granularity based on the individual spectrum requirements. The method may further include assigning each particular signal a channel spectrum equal to an integer multiple of the minimum spectrum granularity.

9 Claims, 3 Drawing Sheets

METHOD AND SYSTEM FOR CALCULATING SPECTRUM GRANULARITY IN FLEXIBLE GRID OPTICAL NETWORKS

CROSS-REFERENCE TO RELATED APPLICATIONS

This application claims the benefit of U.S. Provisional Application No. 61/474,560 filed on Apr. 12, 2011, entitled "Calculating Spectrum Granularity in Flexible Grid Optical Networks," which is incorporated herein in its entirety.

TECHNICAL FIELD OF THE INVENTION

The present invention relates generally to communication networks and, more particularly, to a method and system for calculating spectrum granularity in flexible grid optical networks.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss. An optical network may be configured to combine modulated signals at various wavelengths or optical frequencies (also known as "channels") into a single optical fiber. Each disparate channel may include optically encoded information to be communicated throughout the optical network. Such combining of various channels into a single fiber is known as wavelength-division multiplexing (WDM). Dense wavelength division multiplexing (DWDM) refers to multiplexing a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in networks would be limited to the bit rate of solely one wavelength. With more bandwidth, optical networks are capable of transmitting greater amounts of information.

Most of the presently-existing optical networks today are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

SUMMARY

In accordance with embodiments of the present disclosure, a method may include determining individual spectrum requirements for each of a plurality of signals to be communicated in an optical network, wherein a first signal of the plurality of signals has a first spectrum requirement and a second signal of the plurality of signals has a second spectrum requirement. The method may also include calculating a minimum spectrum granularity based on the individual spectrum requirements. The method may further include assigning each particular signal a channel spectrum equal to an integer multiple of the minimum spectrum granularity.

Certain embodiments of the invention may provide one or more technical advantages. For example, methods and systems disclosed herein may provide for improved spectrum granularity for flexible grid networks operating mixed-rate signals, thus eliminating or reducing slot fragmentation in optical networks.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
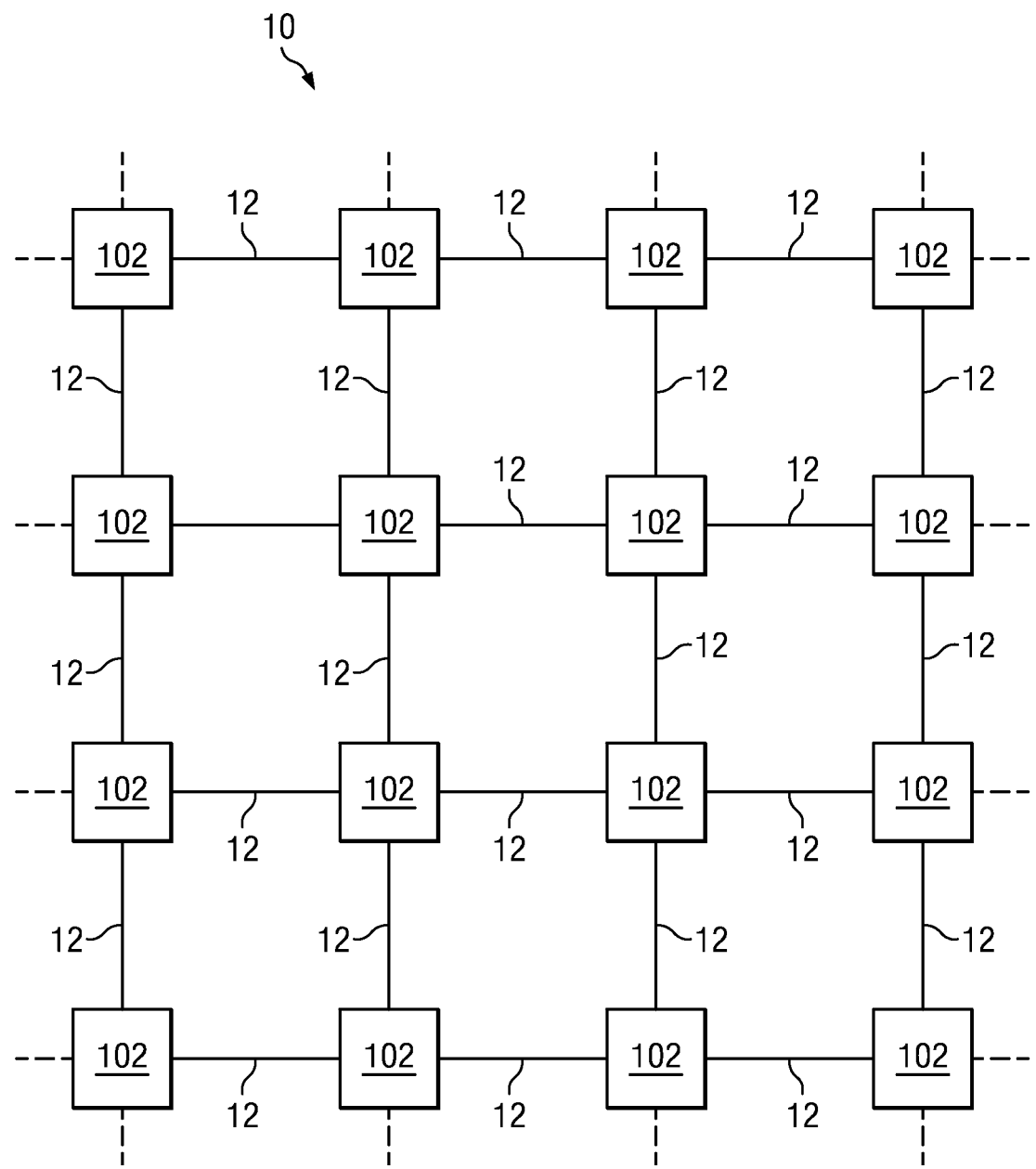
FIG. 1 illustrates a block diagram of an example network, in accordance with embodiments of the present disclosure.
Figure 2:
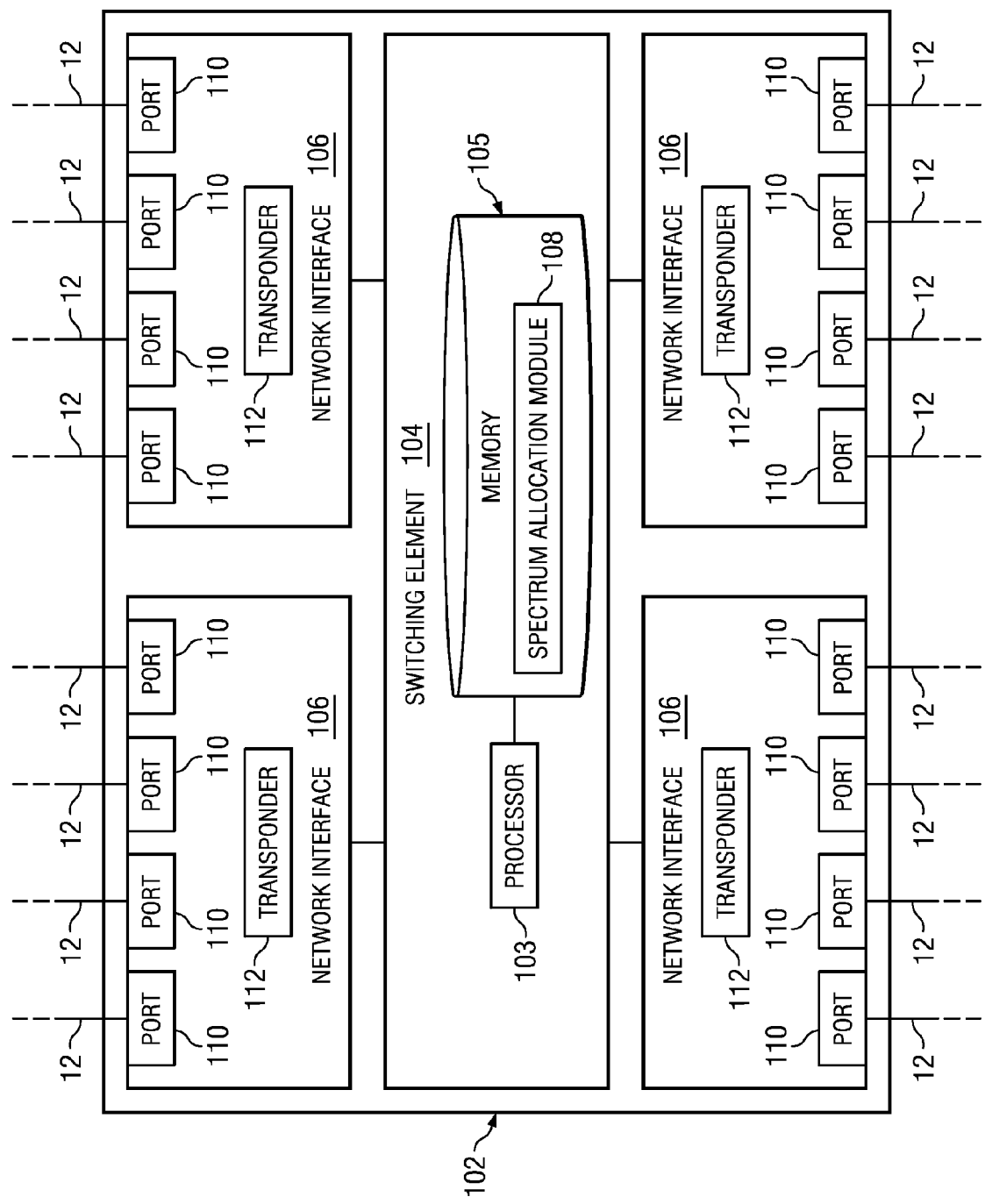
FIG. 2 illustrates a block diagram an example network element, in accordance with embodiments of the present disclosure.
Figure 3:
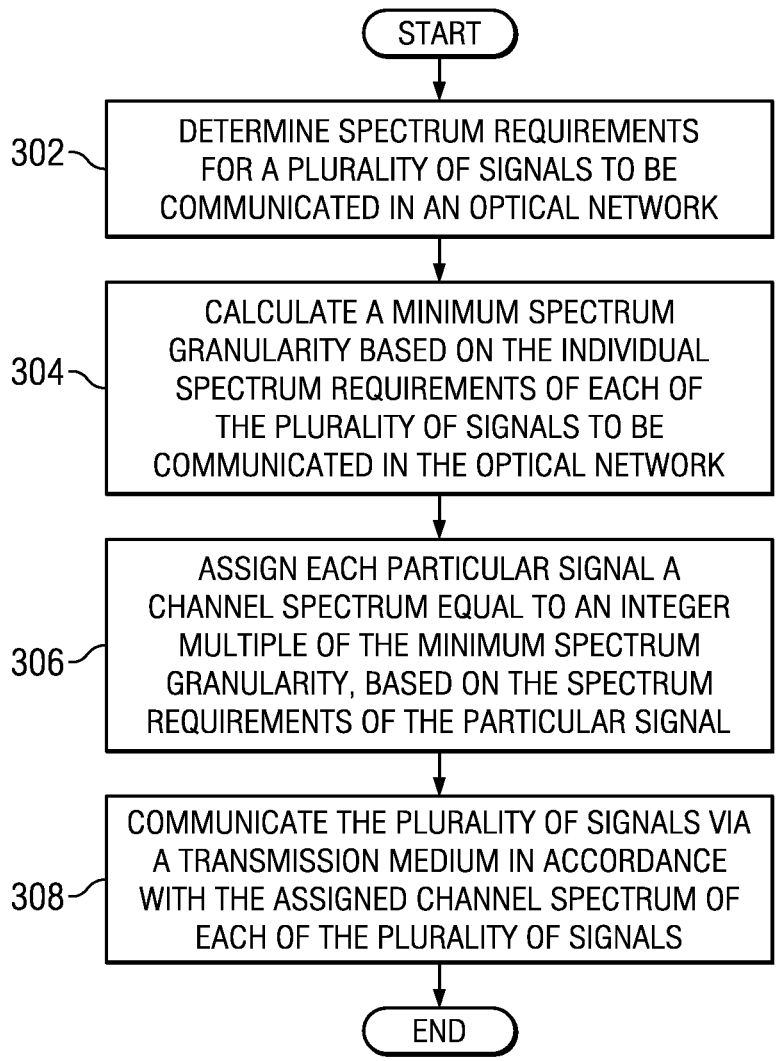
FIG. 3 illustrates a flow chart for an example method for calculating spectrum granularity in a flexible grid optical network, in accordance with embodiments of the present disclosure.

Embodiments of the present invention and its advantages are best understood by referring to FIGS. 1-3, like numerals being used for like and corresponding parts of the various drawings.

FIG. 1 illustrates a block diagram of an example network 10, in accordance with certain embodiments of the present disclosure. In certain embodiments, network 10 may be an Ethernet network. Network 10 may include one or more transmission media 12 operable to transport one or more signals communicated by components of network 10. The components of network 10, coupled together by transmission media 12, may include a plurality of network elements 102. In the illustrated network 10, each network element 102 is coupled to four other nodes to create a mesh. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks. Network 10 may represent all or a portion of a short-haul metropolitan network, a long-haul inter-city network, and/or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, copper cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream. As used herein, the term "datagram" will be used to generally referred to any data structure used to convey traffic, including without limitation a packet, a frame, an unstructured bit stream, or any other suitable data structure.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

FIG. 2 illustrates a block diagram an example network element 102, in accordance with certain embodiments of the present disclosure. As discussed above, each network element 102 may be coupled to one or more other network elements 102 via one or more transmission media 12. In some embodiments, however, not all network elements 102 may be directly coupled as shown in FIG. 2. Each network element 102 may generally be configured to receive data from and/or transmit data to one or more other network elements 102. In certain embodiments, network element 102 may comprise a switch or router configured to transmit data received by network element 102 to another device (e.g., another network element 102) coupled to network element 102.

As depicted in FIG. 2, network element 102 may include a processor 103, a memory 105, a switching element 104, and one or more network interfaces 106 communicatively coupled to switching element 104.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 105 and/or another component of network element 102. Although FIG. 2 depicts processor 103 as a component independent from network interfaces 106, in some embodiments one or more processors 103 may reside on network interfaces 106 and/or other components of a network element 102.

Memory 105 may be communicatively coupled to processor 103 and may include any system, device, or apparatus configured to retain program instructions and/or data for a period of time (e.g., computer-readable media). Memory 105 may include random access memory (RAM), electrically erasable programmable read-only memory (EEPROM), a PCMCIA card, flash memory, magnetic storage, opto-magnetic storage, or any suitable selection and/or array of volatile or non-volatile memory that may retain data after power to network element 102 is turned off. In certain embodiments, memory 105 may comprise a ternary content-addressable memory (TCAM). Although FIG. 2 depicts memory 105 as independent from network interfaces 106, in some embodiments one or more memories 105 may reside on network interfaces 106 and/or other components of network element 102.

As shown in FIG. 2, memory 105 may include a spectrum allocation module 108. Spectrum allocation module 108 may include any system, device, or apparatus configured to allocate to each signal channel a portion of the communication spectrum of the transmission medium 12 over which the signal channel is allocated. In addition, spectrum allocation module 108 may be configured to, based on the individual spectrum requirements of each respective signal channel, calculate a minimum spectrum granularity, and assign each signal channel a channel spectrum equal to an integer multiple of the minimum spectrum granularity. In certain embodiments, the minimum spectrum granularity may be equal to the greatest common factor of the individual spectrum requirements.

For example, as an illustration of the functionality of spectrum allocation module 108, if three mixed-rate signals have spectrum requirements of 50 GHz, 125 GHz, and 200 GHz respectfully, spectrum allocation module 108 may determine that 25 GHz is the greatest common factor of the individual spectrum requirements, and thus determine 25 GHz as the minimum spectrum granularity. Spectrum allocation module may assign each signal a channel spectrum equal to an integer multiple of the minimum spectrum granularity. Specifically, in the present example, one signal may be assigned a 50 GHz channel spectrum (2 times minimum spectrum granularity), another signal may be assigned a 125 GHz channel spectrum (5 times the minimum spectrum granularity), and another signal may be assigned a 200 GHz channel spectrum (8 times the minimum spectrum granularity. Once channel spectra have been assigned, the mixed-rate signals may be combined into a single transmission medium for transmission.

Although spectrum allocation module 108 is depicted as being stored upon memory 105, in some embodiments, spectrum allocation module 108 may be implemented in hardware and/or firmware components of network element 102. In addition, although resource allocation module 108 is depicted as being stored upon memory 105, in some embodiments, spectrum allocation module 108 may be an integral component of another component of network element 102 (e.g., spectrum allocation module 108 may be integral to a network interface 106, or distributed among network interfaces 106 of a network element 102.

Switching element 104 may include any suitable system, apparatus, or device configured to receive traffic via a network interface and forward such traffic to a particular network interface 106 and/or port 110 based on analyzing the contents of the datagrams carrying the traffic and/or based on a characteristic of a signal carrying the datagrams (e.g., a wavelength and/or modulation of the signal). For example, in certain embodiments, a switching element 104 may include a switch fabric (SWF).

Each network interface 106 may be communicatively coupled to switching element 104 and may include any suitable system, apparatus, or device configured to serve as an interface between a network element 102 and a transmission medium 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card. In these and other embodiments, one or more network interfaces may include a network processing unit (NPU).

As depicted in FIG. 2, each of network interfaces 106 may include one or more physical ports 110. Each physical port 110 may include any system, device or apparatus configured to serve as a physical interface between a corresponding transmission medium 12 and network interface 106. For example, a physical port 110 may comprise an Ethernet port, an optical port, or any other suitable port.

In addition, as shown in FIG. 2, each of network interfaces 106 may include one or more transponders 112. A transponder 112 may include any system, device, or apparatus configured to transmit via a transmission medium (e.g., and optical fiber) or receive via a transmission medium (e.g., an optical fiber) an optical signal on a particular channel or wavelength. For example, in embodiments in which a network element 102 comprises a ROADM, a signal originating in the given network element 102 may be converted from an electrical to an optical signal by a transponder 112 (e.g., following processing of the signal by other components of network element 102), and transmitted from the transponder 112 via a transmission medium on a transmission medium 12. On the other hand, a signal terminating in the given network element 102 may be received at a transponder 112 via a transmission medium and converted from an optical signal to an electrical signal (e.g., for further processing of the signal by other components of network element 102). Signals that do not originate or terminate in a given network element 102, but rather pass through a network element 102, may be received on an ingress port 110 and routed to an egress port 110 by switching element 104, and thus, such signals do not require a transponder at the given network element 102.

FIG. 3 illustrates a flow chart for an example method 300 for calculating spectrum granularity in a flexible grid optical network, in accordance with embodiments of the present disclosure. According to some embodiments, method 300 may begin at step 302. As noted above, teachings of the present disclosure may be implemented in a variety of configurations of network 10 and/or network element 102. As such, the preferred initialization point for method 300 and the order of the steps 302-308 comprising method 300 may depend on the implementation chosen.

At step 302, a spectrum allocation module (e.g., spectrum allocation module 108) and/or another component of a network element may determine spectrum requirements for a plurality of signals to be communicated in an optical network.

At step 304, a spectrum allocation module and/or another component of a network element may calculate a minimum spectrum granularity, based on the individual spectrum requirements of each of the plurality of signals to be communicated in the optical network. In certain embodiments, the minimum spectrum granularity may be equal to the greatest common factor of the individual spectrum requirements of each of the plurality of signals to be communicated in the optical network.

At step 306, a spectrum allocation module and/or another component of a network element may assign each particular signal a channel spectrum equal to an integer multiple of the minimum spectrum granularity, based on the spectrum requirements of the particular signal.

At step 308, a network element may communicate the plurality of signals via a transmission medium in accordance with the assigned channel spectrum of each of the plurality of signals. After completion of step 308, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using network element 102 or any other system operable to implement method 300. In certain embodiments, method 300 may be implemented partially or fully in software and/or firmware embodied in a memory or other computer-readable media (e.g., memory 105) and executable by a processor or other suitable device (e.g. processor 103).

A component of network 10 and/or a network element 102 may include an interface, logic, memory, and/or other suitable element. An interface receives input, sends output, processes the input and/or output, and/or performs other suitable operations. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 and/or a network element 102 without departing from the scope of the invention. The components of network 10 and/or network element 102 may be integrated or separated. Moreover, the operations of network 10 and/or network element 102 may be performed by more, fewer, or other components. Additionally, operations of network 10 and/or a network element 102 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   determining individual spectrum requirements for each of a plurality of signals to be communicated in an optical network, wherein a first signal of the plurality of signals has a first spectrum requirement and a second signal of the plurality of signals has a second spectrum requirement;

calculating a minimum spectrum granularity to equal the greatest common factor of the individual spectrum requirements; and assigning each particular signal a channel spectrum equal to an integer multiple of the minimum spectrum granularity.

2. A method according to claim 1, further comprising communicating the plurality of signals via a transmission medium, each channel communicated with its respective assigned channel spectrum.

3. A method according to claim 1, wherein the assigned channel spectrum for each particular signal is equivalent to its respective spectrum requirement.

4. A network element comprising:

a processor; and a spectrum allocation module communicatively coupled to the processor and configured to, either individually or in concert with one or more other spectrum allocation modules integral to one or more other network elements:

determine individual spectrum requirements for each of a plurality of signals to be communicated in an optical network, wherein a first signal of the plurality of signals has a first spectrum requirement and a second signal of the plurality of signals has a second spectrum requirement;

calculate a minimum spectrum granularity to equal the greatest common factor of the individual spectrum requirements; and assign each particular signal a channel spectrum equal to an integer multiple of the minimum spectrum granularity.

5. A network element according to claim 4, further comprising one or more components configured to communicate the plurality of signals via a transmission medium, each channel communicated with its respective assigned channel spectrum.

6. A network element according to claim 4, the spectrum allocation module further configured to assign the channel spectrum for each particular signal equivalent to its respective spectrum requirement.

7. An article of manufacture, comprising:

a non-transitory computer readable medium;

computer-executable instructions carried on the non-transitory computer readable medium, the instructions readable by a processor, the instructions, when read and executed, for causing the processor to:

determine individual spectrum requirements for each of a plurality of signals to be communicated in an optical network, wherein a first signal of the plurality of signals has a first spectrum requirement and a second signal of the plurality of signals has a second spectrum requirement;

calculate a minimum spectrum granularity to equal the greatest common factor of the individual spectrum requirements; and assign each particular signal a channel spectrum equal to an integer multiple of the minimum spectrum granularity.

8. An article according to claim 7, the instructions further for causing the processor to communicate the plurality of signals via a transmission medium, each channel communicated with its respective assigned channel spectrum.

9. An article according to claim 7, wherein the assigned channel spectrum for each particular signal is equivalent to its respective spectrum requirement.

\* \* \* \* \*